US011189317B2

(12) United States Patent
Matsumoto

(10) Patent No.: US 11,189,317 B2
(45) Date of Patent: Nov. 30, 2021

(54) MAGNETIC RECORDING APPARATUS AND METHOD OF CONTROLLING MAGNETIC HEAD THEREOF

(71) Applicants: Kabushiki Kaisha Toshiba, Tokyo (JP); Toshiba Electronic Devices & Storage Corporation, Tokyo (JP)

(72) Inventor: Takuya Matsumoto, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/038,446

(22) Filed: Sep. 30, 2020

(65) Prior Publication Data
US 2021/0012803 A1 Jan. 14, 2021

Related U.S. Application Data

(63) Continuation of application No. 16/773,032, filed on Jan. 27, 2020, now Pat. No. 10,825,478.

(30) Foreign Application Priority Data

May 17, 2019 (JP) .............................. JP2019-093786

(51) Int. Cl.
*G11B 5/54* (2006.01)
*G11B 20/10* (2006.01)
(Continued)

(52) U.S. Cl.
CPC .... *G11B 20/10388* (2013.01); *G11B 20/1803* (2013.01); *G11B 20/12* (2013.01);
(Continued)

(58) Field of Classification Search
CPC ......... G11B 5/54; G11B 11/10; G11B 11/105; G11B 2005/0021; G11B 5/59677;
(Continued)

(56) References Cited

U.S. PATENT DOCUMENTS 8,284,635 B2  10/2012  Matsumoto
8,797,672 B2   8/2014  Tanabe et al.
(Continued)

FOREIGN PATENT DOCUMENTS

JP   4794516 B2  10/2011
JP   4836966 B2  12/2011
(Continued)

*Primary Examiner* — Nabil Z Hindi
(74) *Attorney, Agent, or Firm* — Allen & Overy, LLP

(57) ABSTRACT

According to one embodiment, a magnetic recording apparatus measures and stores recording signal quality of a disk at an initial stage, inspects the recording signal quality before data is recorded, determines whether or not the recording signal quality obtained in the inspection satisfies a standard when compared to the stored recording signal quality at the initial stage, adjusts, based on a result of the determination, light irradiation power of a light irradiation element so as to satisfy the standard, determines a read offset amount based on a result of the adjustment, and performs control so that a position of a read head is shifted based on the determined read offset amount.

14 Claims, 17 Drawing Sheets

(51) Int. Cl.
*G11B 20/18* (2006.01)
*G11B 20/12* (2006.01)
*G11B 5/00* (2006.01)

(52) U.S. Cl.
CPC .............. *G11B 2005/0021* (2013.01); *G11B 2020/1238* (2013.01); *G11B 2020/1292* (2013.01)

(58) Field of Classification Search
CPC ............ G11B 33/14; G11B 33/1406; G11B 11/10506; G11B 11/1051; G11B 7/1263; G11B 7/1267; G11B 20/10388; G11B 5/5543; G11B 20/1816
USPC .............. 369/75, 59, 78.11, 97.12, 313
See application file for complete search history.

(56) References Cited

U.S. PATENT DOCUMENTS

| | | | |
|---|---|---|---|
| 9,214,186 B1* | 12/2015 | Haralson | G11B 5/455 |
| 9,236,081 B1 | 1/2016 | Chu et al. | |
| 9,311,951 B1* | 4/2016 | Chu | G11B 5/02 |
| 9,336,813 B2 | 5/2016 | Tagami | |
| 9,336,831 B2 | 5/2016 | Burnett et al. | |
| 9,384,774 B1* | 7/2016 | Nookala | G11B 5/02 |
| 9,711,172 B1 | 7/2017 | Teguri | |
| 10,056,109 B2* | 8/2018 | Liu | G11B 20/1217 |

FOREIGN PATENT DOCUMENTS

| | | | |
|---|---|---|---|
| JP | 2016-35794 A | 3/2016 | |
| JP | 2016-194967 A | 11/2016 | |
| JP | 2017-123210 A | 7/2017 | |

\* cited by examiner

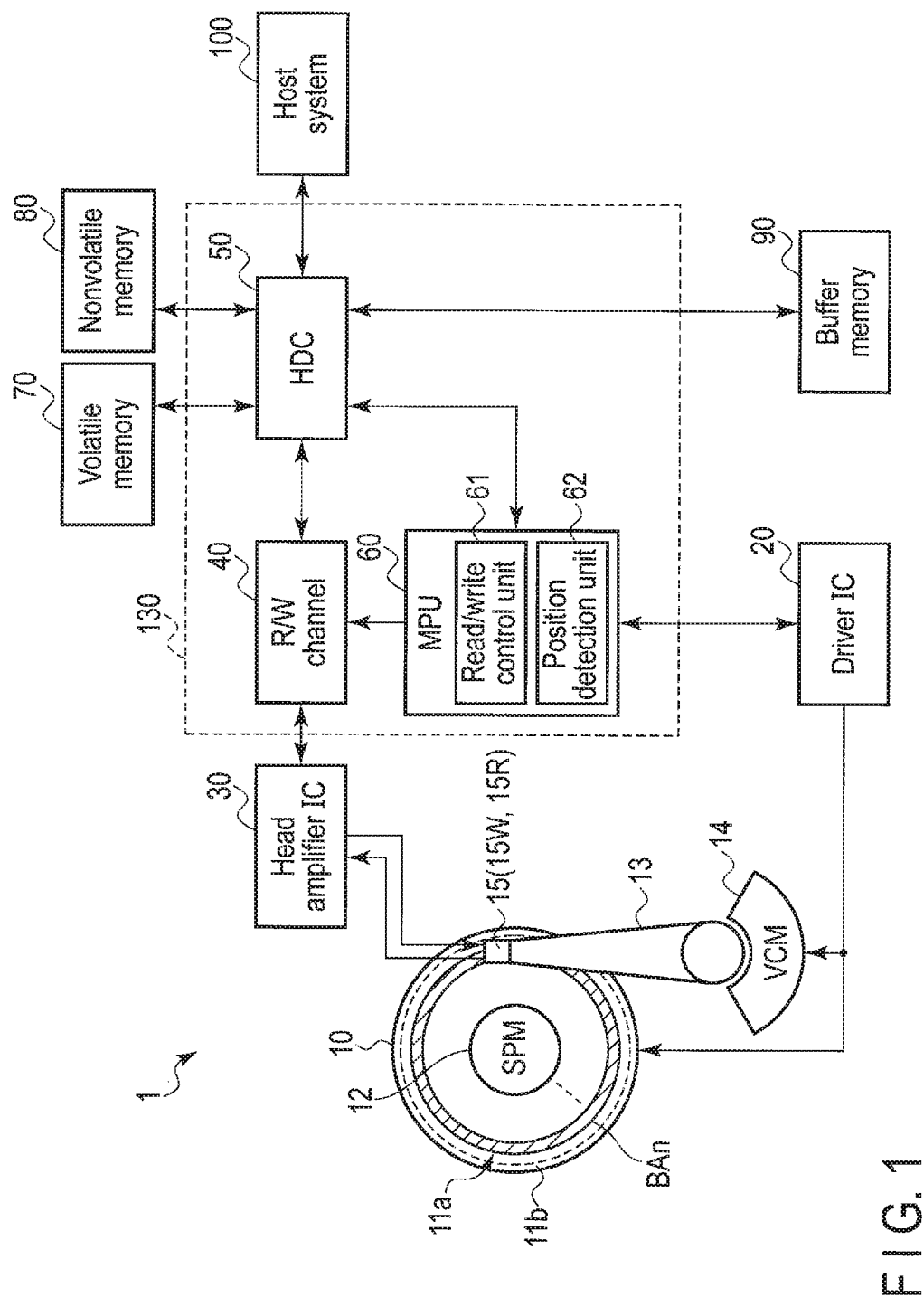
F I G. 1

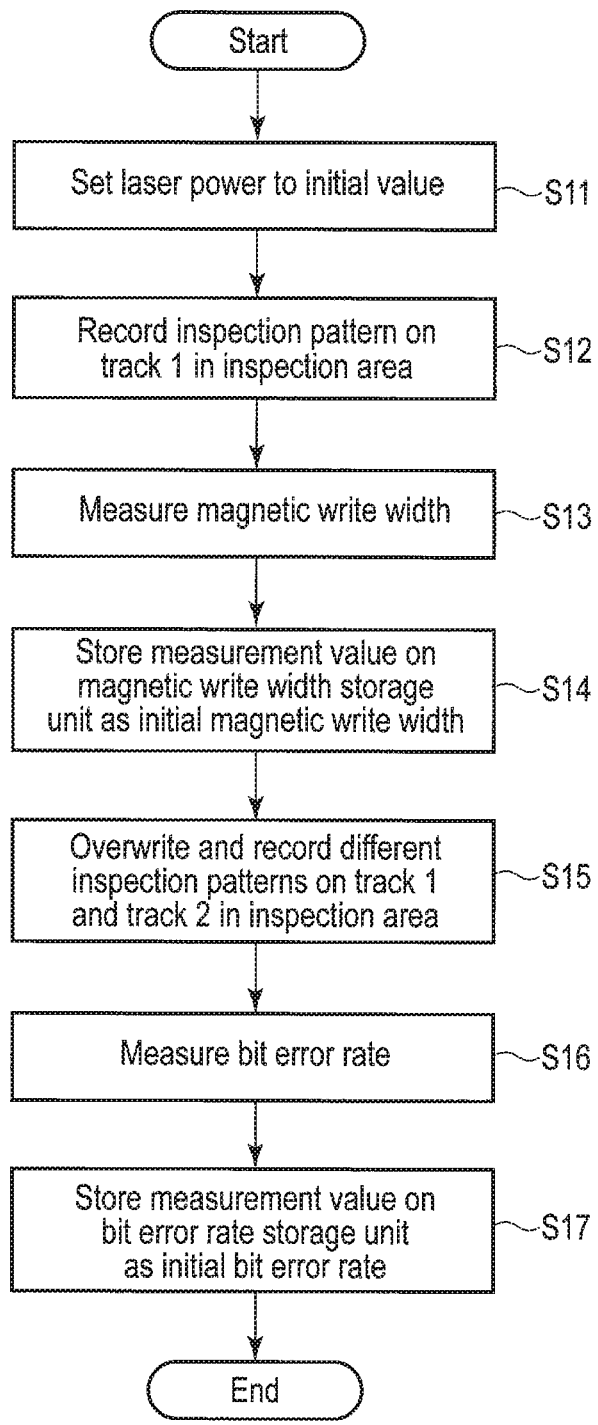
F I G. 5

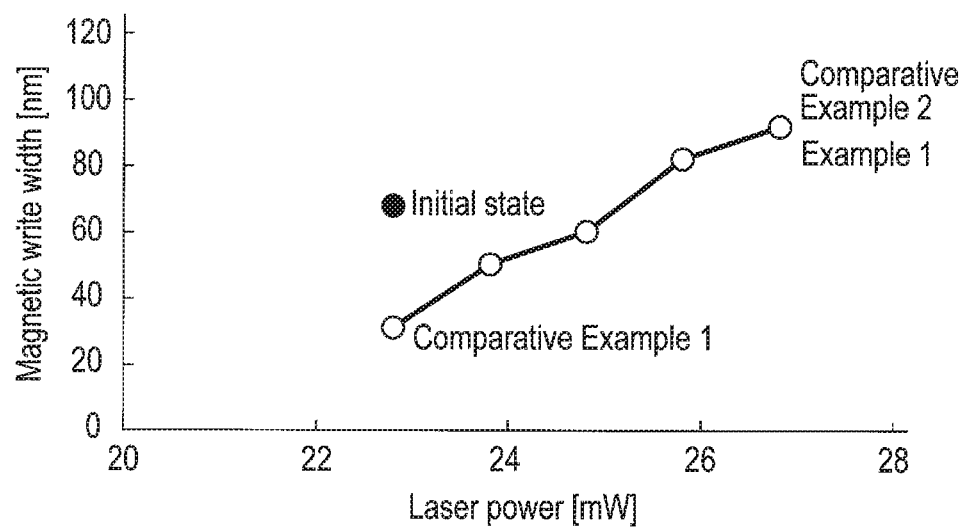
F I G. 7
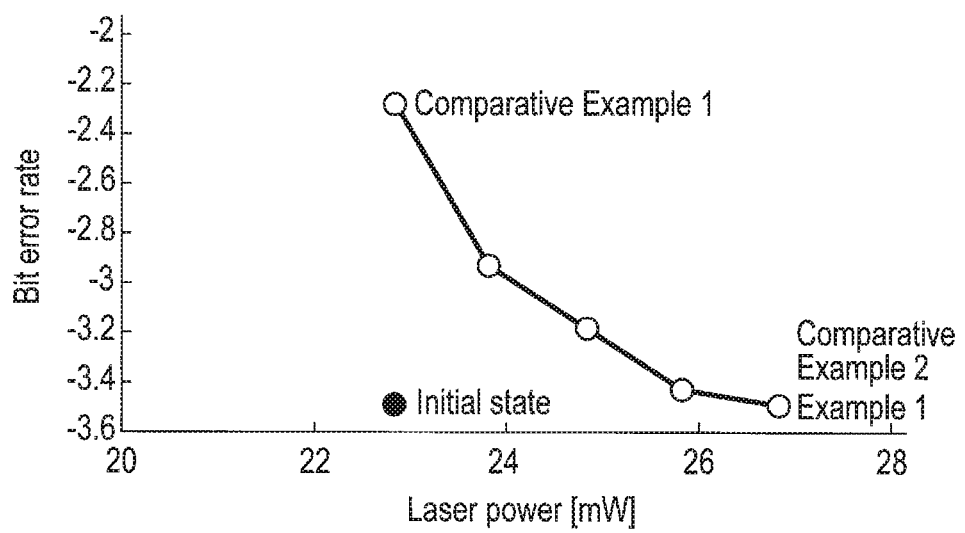
F I G. 8

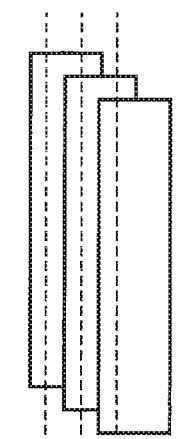
Initial state
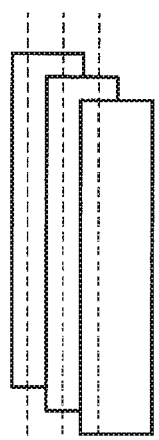
Initial state
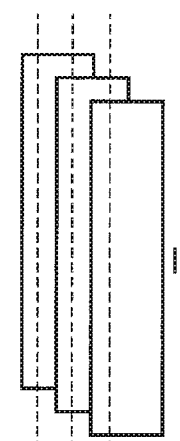
Initial state
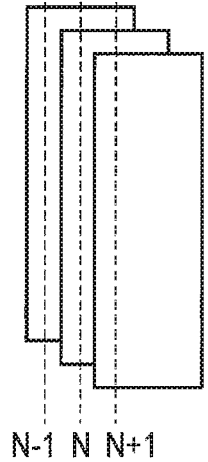
Example 1
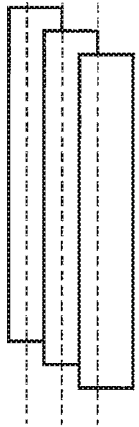
Comparative Example 1
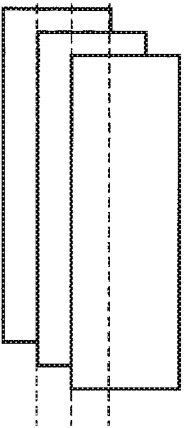
Comparative Example 2
N-1  N  N+1
F I G. 10A          F I G. 10B          F I G. 10C

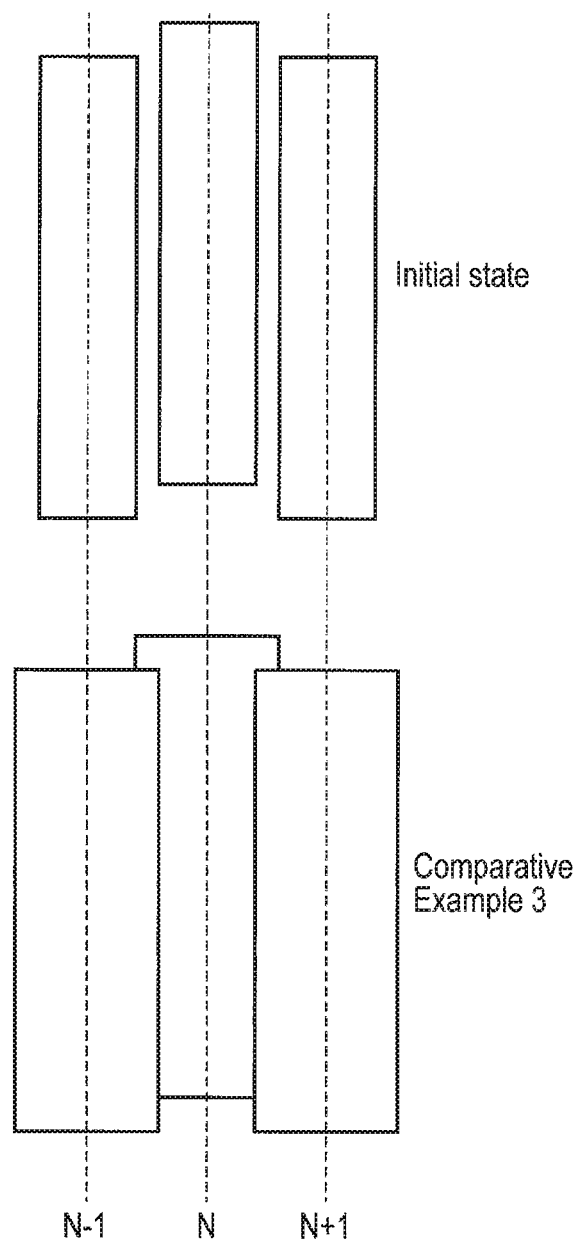
F I G. 13

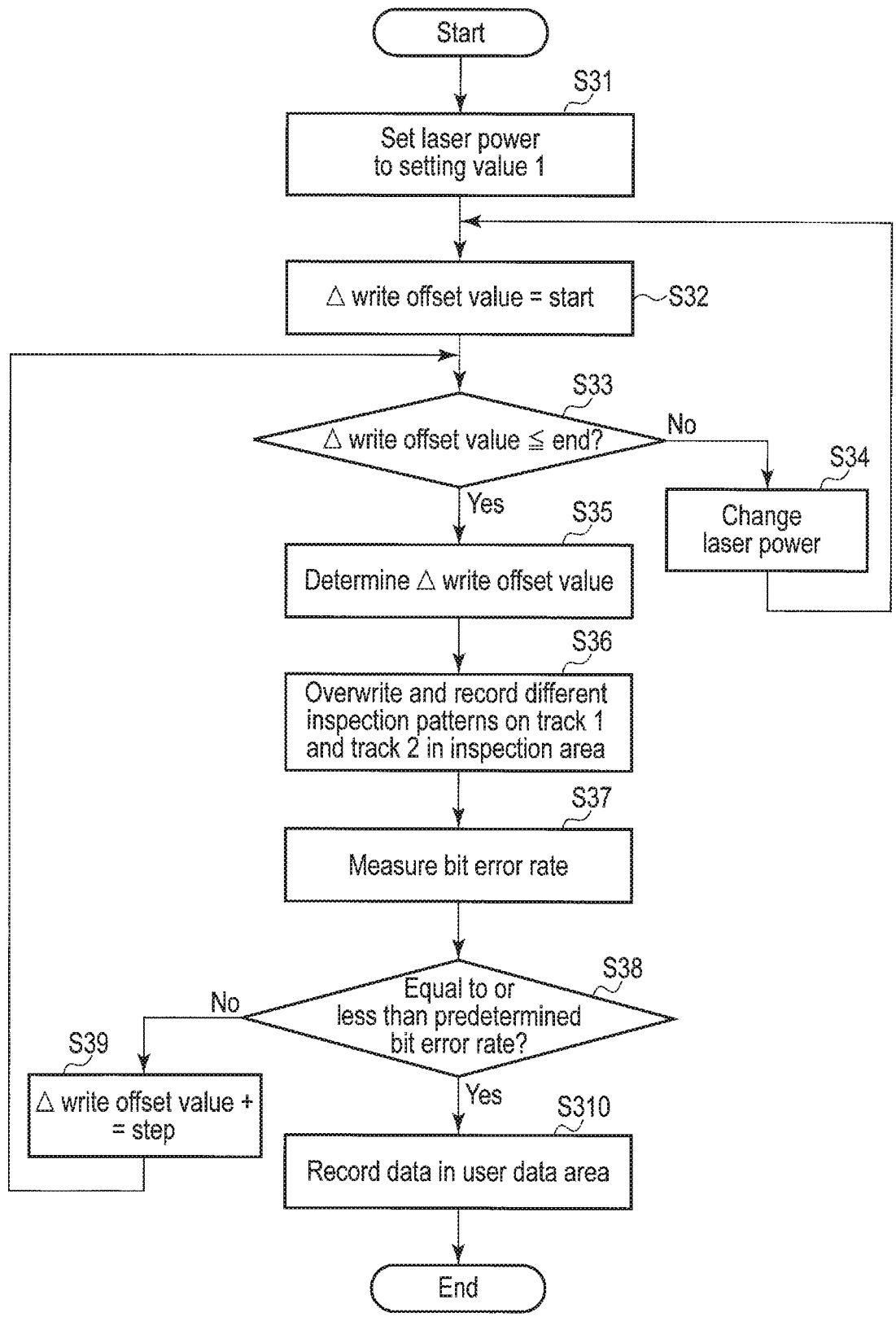
F I G. 14

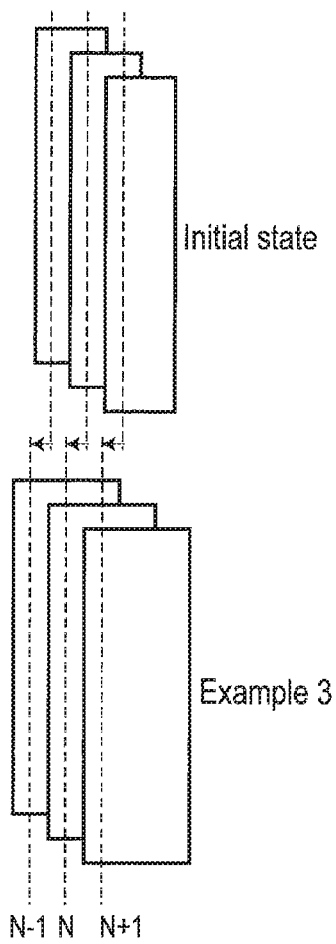
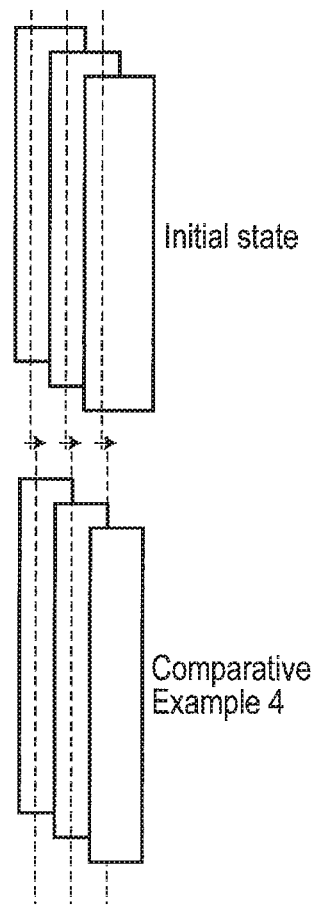
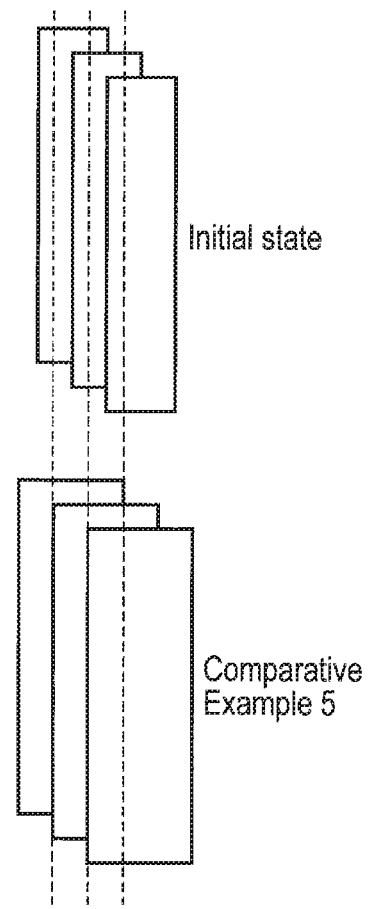
F I G. 19A  F I G. 19B  F I G. 19C sics # MAGNETIC RECORDING APPARATUS AND METHOD OF CONTROLLING MAGNETIC HEAD THEREOF

CROSS-REFERENCE TO RELATED APPLICATIONS

This application is a continuation of application Ser. No. 16/773,032 filed on Jan. 27, 2020 and is based upon and claims the benefit of priority from Japanese Patent Application No. 2019-093786, filed May 17, 2019, the entire contents of which are incorporated herein by reference.

FIELD

Embodiments described herein relate generally to a magnetic recording apparatus in which a perpendicular recording method is employed and a method of controlling a magnetic head thereof.

BACKGROUND

In recent years, a recording technique referred to as "shingled write magnetic recording" (SMR) or "shingled write recording" (SWR) has been developed for magnetic recording apparatuses (e.g., hard disk drive (HDD)) in order to achieve a high recording capacity. In the shingled write magnetic recording, when data is written to a magnetic disk, data is recorded while the next recording track is overlapping a part of an adjacent track. This improves track per inch (TPI), thereby achieving the high recording capacity.

Further, a recording technique referred to as "thermally assisted magnetic recording (TAMR) method" has been developed for the magnetic recording apparatuses in order to achieve a high recording density. In this thermally assisted magnetic recording method, in a magnetic head including a near-field light irradiation element, a medium recording layer having high perpendicular magnetic anisotropy is irradiated with near-field light emitted from a tip of the near-field light irradiation element and is locally heated when data is written. As a result, coercivity of a heated portion of the recording layer is sufficiently reduced at the time of recording. This makes it possible to achieve the high recording density.

However, heat is generated inside the near-field light irradiation element when near-field light is generated. Depending on a temperature of this heat generation, a shape of the element is deformed due to migration of atoms of material from which the near-field light irradiation element is made. For this reason, it may be difficult to maintain quality of signals recorded at a linear recording density (BPI) and a track density (TPI) that are initially set because of change over time. This makes it difficult to ensure long-term reliability.

It is an object of embodiments of the present invention is to provide a magnetic recording apparatus that can maintain quality of signals recorded at a set linear recording density (BPI) and track density (TPI) even in a case where a near-field light irradiation element changes over time and can maintain long-term reliability and to provide a method of controlling a magnetic head thereof.

BRIEF DESCRIPTION OF THE DRAWINGS

FIG. 1 is a block diagram showing a configuration of a magnetic recording apparatus according to an embodiment.

FIG. 5 is a flowchart showing a flow of initial information storage processing in Example 1 of a magnetic recording apparatus according to an embodiment.

FIG. 7 is a diagram showing a relationship between laser power and a magnetic write width in Example 1, Comparative Example 1, and Comparative Example 2 of a magnetic recording apparatus according to an embodiment.

FIG. 8 is a diagram showing a relationship between laser power and a bit error rate in Example 1, Comparative Example 1, and Comparative Example 2 of a magnetic recording apparatus according to an embodiment.

FIGS. 10A, 10B, and 10C are schematic diagrams showing a relationship between a track position and a read head position in Example 1, Comparative Example 1, and Comparative Example 2, respectively, of a magnetic recording apparatus according to an embodiment.

FIG. 13 is a schematic diagram showing a positional relationship among a track, a write head, and a read head in Comparative Example 3 for use in description of an embodiment.

FIG. 14 is a flowchart showing a flow of inspection processing in Example 2 of a magnetic recording apparatus according to an embodiment.

FIGS. 19A, 19B, and 19C are schematic diagrams showing a positional relationship between a track and a read head in Example 3, Comparative Example 4, and Comparative Example 5, respectively, of a magnetic recording apparatus according to an embodiment.

DETAILED DESCRIPTION

Figure 2:
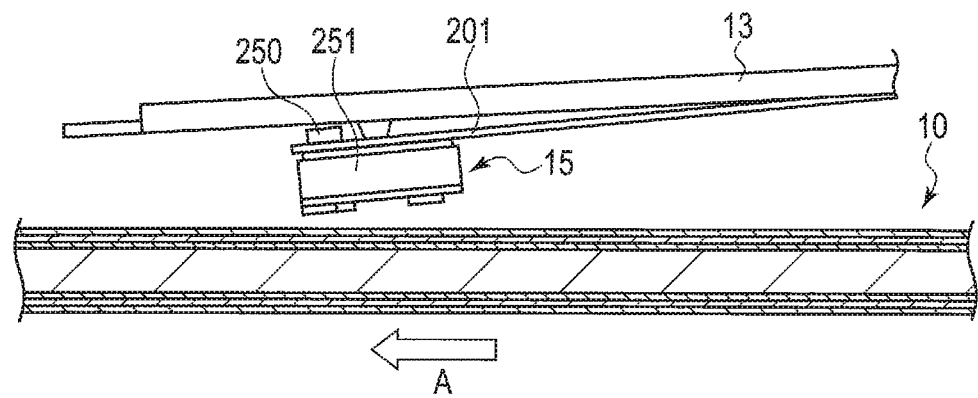
FIG. 2 is an enlarged side view showing a magnetic head and a magnetic disk of a magnetic recording apparatus according to an embodiment.

Embodiments will be described hereinafter with reference to the accompanying drawings.

In general, according to one embodiment, a magnetic recording apparatus includes: a disk which includes a track group including a first track and a second track partially overlapping the first track; a magnetic head which includes a light irradiation element which emits light for heating the disk, a write head which writes data to a range of the disk heated by the light emitted by the light irradiation element, and a read head which reads data from a track in the track group of the disk; and a controller which controls positions of the write head and the read head. The controller executes: storage processing which measures and stores recording signal quality of the disk at an initial stage; inspection processing which inspects the recording signal quality before data is recorded; determination processing which determines whether or not the recording signal quality obtained in the inspection processing satisfies a standard when compared to the recording signal quality at the initial stage stored in the storage processing; adjustment processing which adjusts, based on a result of the determination in the determination processing, light irradiation power of the light irradiation element so as to satisfy the standard; and position control processing which determines a write offset amount based on a result of the adjustment in the adjustment processing and performing control so that the position of the write head is shifted based on the determined write offset amount.

It is noted that the disclosure is presented by way of example only, and those skilled in the art should understand that matters which can be changed as appropriate without departing from the spirit of the disclosure and which could easily be conceived of naturally fall within the scope of the present disclosure. Further, for clarity of explanation, the drawings may be schematically illustrated in width, thickness, shapes, and the like of components, as compared with actual implementation. However, the drawings are presented by way of example only and are not intended to limit understanding of the present disclosure. Furthermore, in the specification and the drawings, elements similar to those already described with reference to the drawings are denoted by the same reference signs, and detailed description thereof is omitted as appropriate.

Embodiment

FIG. 1 is a block diagram showing a configuration of a magnetic recording apparatus 1 according to this embodiment.

The magnetic recording apparatus 1 includes a head-disk assembly (HDA) described below, a driver IC 20, a head amplifier integrated circuit (hereinafter, referred to as "head amplifier IC") 30, a volatile memory 70, a nonvolatile memory 80, a buffer memory (buffer) 90, and a system controller 130 including a one-chip integrated circuit. Further, the magnetic recording apparatus 1 can be connected to a host system (host) 100.

The HDA includes a magnetic disk (hereinafter, referred to as "disk") 10, a spindle motor (SPM) 12, an arm 13 on which a magnetic head (hereinafter, referred to as "head") 15 is mounted, and a voice coil motor (VCM) 14. The disk 10 is rotated by the spindle motor 12. The arm 13 and the VCM 14 form an actuator. The actuator controls movement of the head 15 mounted on the arm 13 to a predetermined position on the disk 10 by driving the VCM 14. Two or more disks 10 and heads 15 may be provided.

In the disk 10, a shingled write magnetic recording region (SMR region) 11a and a media cache region 11b are allocated to a data region. User data or the like requested to be written by the host 100 is recorded in the shingled write magnetic recording region 11a. The media cache region 11b can be used as a cache for the shingled write magnetic recording region 11a.

The shingled write magnetic recording region 11a is a recording region in which data for the next track is written while the next track is overlapping a part of an adjacent track and which has a higher track density than the media cache region 11b. The shingled write magnetic recording region 11a includes a plurality of track groups (hereinafter, referred to as "band area BAn") including at least one track (first track) on which overwriting is performed, part of the overwriting being performed on an adjacent track, and a track (second track) on which overwriting is finally performed. The second track has a wider track width than the first track. The band area BAn includes a track group for one round of the disk 10. Hereinafter, a track of the head 15 at the time of writing data is referred to as "write track", and a region of the write track excluding a region that overlaps an adjacent write track on which overwriting is performed by shingled write magnetic recording is referred to as "read track". In the first track of the shingled write magnetic recording, a center position of a width of the write track (hereinafter, referred to as "track center") and a track center of the read track do not generally coincide. Note that the write track and the read track may also be simply referred to as "track".

The head 15 will be described with reference to FIGS. 2 and 3.

Figure 3:
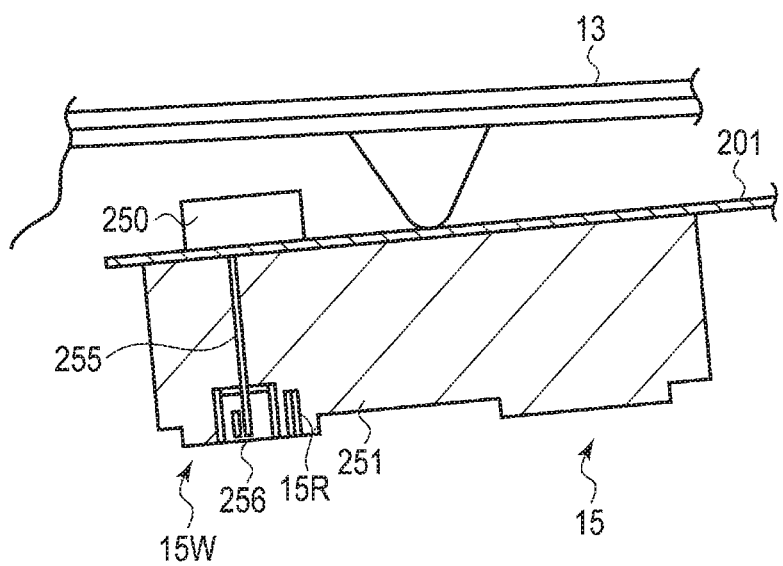
FIG. 3 is a cross-sectional view showing a configuration of a magnetic head of a magnetic recording apparatus according to an embodiment.

FIG. 2 is an enlarged side view showing the head 15 and the magnetic disk 10 of the magnetic recording apparatus according to this embodiment, and FIG. 3 is a cross-sectional view of the head 15 according to this embodiment. FIG. 2 shows a rotation direction A of the disk 10.

The head 15 includes a slider 251. The slider 251 is fixed to a gimbal 201 attached to the arm 13.

The head 15 includes a write head 15W, a read head 15R, a light generation element (e.g., laser diode) 250, a waveguide 255, and a near-field light irradiation element (plasmon generator, near field transducer) 256, each of which is provided in the slider 251.

The read head 15R reads data recorded on a data track on the disk 10. The write head 15W writes data to the disk 10. The write head 15W generates a perpendicular magnetic field on a surface of the disk 10.

The light generation element 250 is a (laser) light source and is provided on the slider 251 or on the gimbal 201. The light generation element 250 supplies light to the waveguide 255. Note that the light generation element 250 may be provided on a place other than the slider 251 or the gimbal 201. For example, the light generation element 250 may be provided on the outside of the arm 13 or the head 15. The waveguide 255 propagates light generated by the light generation element 250 to the near-field light irradiation element 256.

The near-field light irradiation element 256 is provided on a lower end portion of the slider 251 facing the disk 10. When data is written, the near-field light irradiation element 256 generates near-field light from the laser light propagated through the waveguide 255 and irradiates the disk 10 with the near-field light. The near-field light with which the disk is irradiated heats the recording layer of the disk 10 and reduces coercivity of the recording layer of the disk 10. The near-field light irradiation element 256 includes a metal member. Note that a lens for condensing the light propagated from the light generation element 250 on the disk 10 may be provided, instead of the near-field light irradiation element 256.

By irradiating the disk 10 with the near-field light generated from the near-field light irradiation element 256 as described above, the magnetic recording apparatus 1 can perform high-density magnetic recording on the disk 10 that is a high coercivity medium.

The near-field light irradiation element 256 defines a recording width (or track width) written by the write head 15W according to a near-field light irradiation range (or also referred to as "spot range" or "heat distribution width"). That is, the recording width corresponds to a width of the near-field light irradiation range. For example, the near-field light irradiation element 256 defines a track width of the write track (hereinafter, simply referred to as "write track width") by irradiating the near-field light irradiation range at a width smaller than the width of the write head 15W.

For example, in a case where a shape of the near-field light irradiation element is changed due to a factor such as heat generated when the near-field light irradiation element emits near-field light, the near-field light irradiation range is changed, and the track width of the write track written by the write head 15W is accordingly changed. Further, when the track width of the write track written by the write head 15W is changed, a width of a predetermined band area (hereinafter, simply referred to as "band width") is changed.

Figure 4:
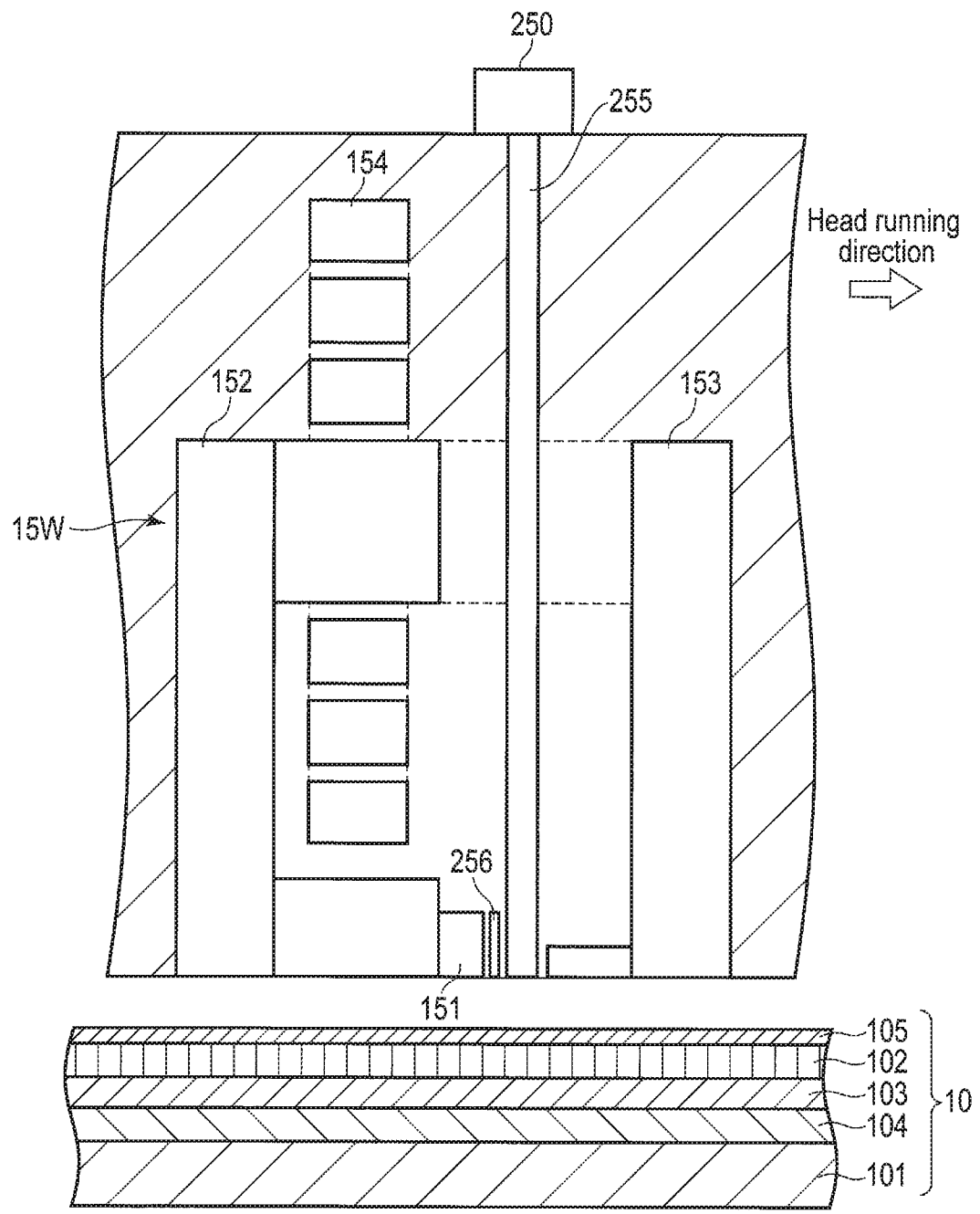
FIG. 4 is a cross-sectional view showing a configuration of a recording head portion of a magnetic head and a magnetic disk of a magnetic recording apparatus according to an embodiment.

FIG. 4 is a cross-sectional view of a write head portion of the head 15 and the magnetic disk 10 serving as a perpendicular recording medium.

The magnetic disk 10 is a recording medium including, on a substrate 101, a perpendicular recording layer 102 having large anisotropy in a direction perpendicular to a disk surface, a crystal orientation layer 103 placed under the perpendicular recording layer 102 in order to improve orientation of the perpendicular recording layer 102, a heat sink layer 104 placed under the crystal orientation layer 103 in order to restrain expansion of a heating region, and a protective film 105 placed on the perpendicular recording layer 102.

The head 15 is a separation type magnetic head that separately including the write head 15W for recording and the read head 15R for reproduction. The write head 15W includes: a main magnetic pole 151 made from high magnetic permeability material that generates a magnetic field in a direction perpendicular to the disk surface; a trailing yoke 152 that is magnetically joined to the main magnetic pole 151 and allows a magnetic flux to flow through the main magnetic pole 151; a return shield magnetic pole 153 placed on a leading side of the main magnetic pole 151 and provided to efficiently close a magnetic path immediately below the main magnetic pole 151; a coil 154 placed to wind around the magnetic path including the trailing yoke 152 and the return shield magnetic pole 153 in order to allow a magnetic flux to flow through the main magnetic pole 151; the near-field light irradiation element 256 that is placed on the leading side of the main magnetic pole 151 and generates near-field light for heating the recording layer 102 of the magnetic disk 10; and the waveguide 255 for propagating light for generating near-field light.

The near-field light irradiation element 256 is preferably made from Au, Pd, Pt, Rh, Ir, or an alloy that is a combination thereof. The main magnetic pole 151 and the near-field light irradiation element 256 are joined via an insulation layer (not shown). This insulation layer is preferably an oxide such as SiO2 and Al2O3.

Example 1

Contents of processing of Example 1 in the shingled write magnetic recording apparatus 1 having the above-described configuration will be described.

Figure 6:
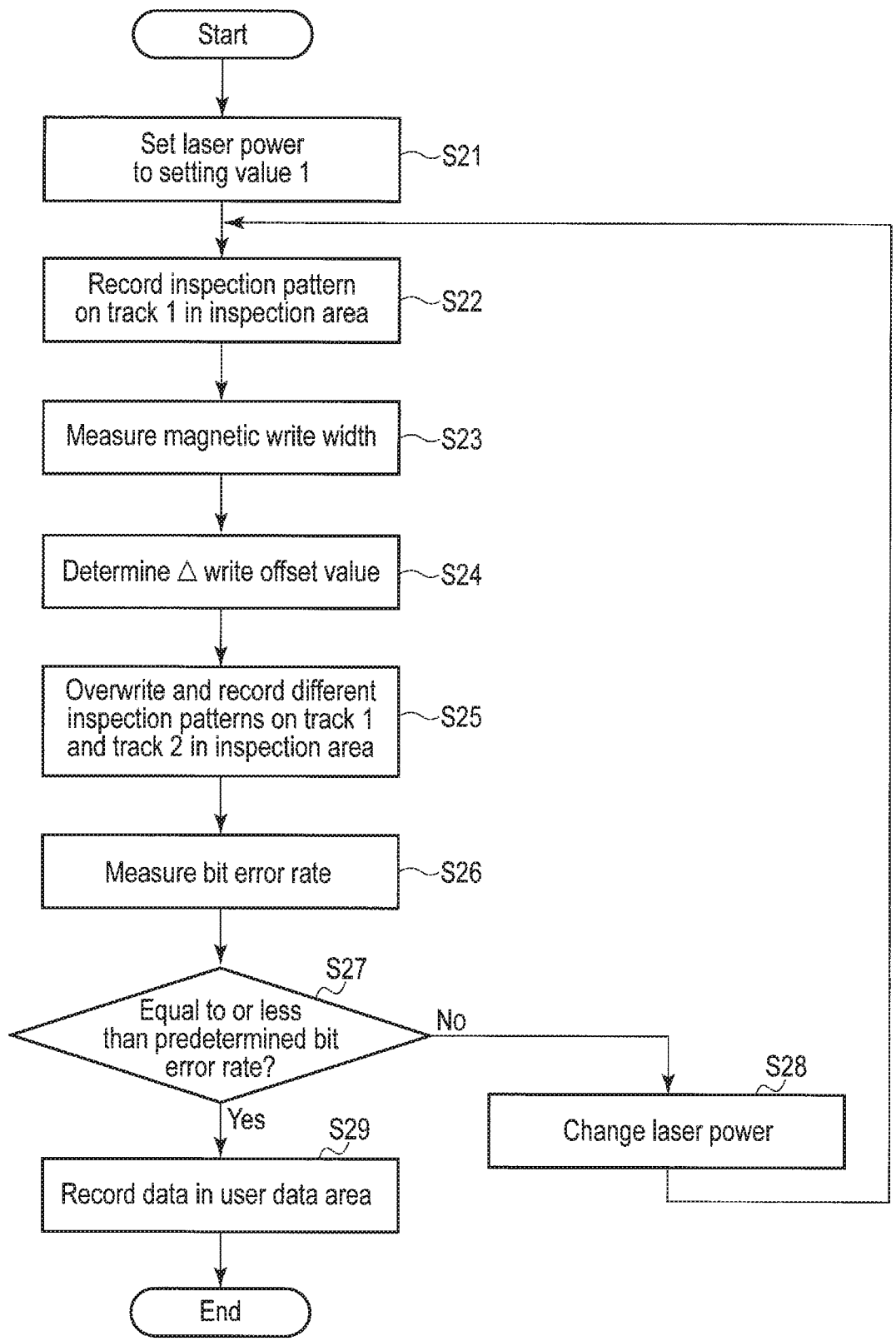
FIG. 6 is a flowchart showing a flow of inspection processing in Example 1 of a magnetic recording apparatus according to an embodiment.

FIG. 5 is a flowchart showing a flow of initial information storage processing in Example 1, and FIG. 6 is a flowchart showing a flow of inspection processing in Example 1.

The magnetic recording apparatus 1 is set to have optimum laser power, linear recording density, and track density in a manufacturing process. At this time, in an inspection area, an initial magnetic write width and an initial bit error rate are measured and stored in respective storage units (e.g., prepared in the nonvolatile memory 80) in accordance with the initial information storage processing shown in FIG. 5. The inspection area may be an area different from a user data area of the magnetic disk 10 or a part of a band of the user data area. A band includes a plurality of track groups. In the shingled write magnetic recording, rewriting is performed in the unit referred to as "band".

In FIG. 5, the magnetic recording apparatus 1 sets laser power to an initial value (Step S11) and records an inspection pattern for measuring a magnetic write width on a track 1 in the inspection area (Step S12). The initial value of the laser power is set in the manufacturing process. Then, the magnetic write width is measured based on a recording track (step S13), and the measurement value is stored on a magnetic write width storage unit as the initial magnetic write width (step S14). An inspection pattern for measuring a bit error rate is recorded on the track 1 in the inspection area, and thereafter another pattern is recorded on an adjacent track 2 (step S15). Because the shingled write magnetic recording is employed, overwriting is performed on the track 2 while the track 2 is partially overlapping the track 1. The bit error rate of the track 1 on which overwriting has been performed is measured (step S16), and the measurement value is stored on a bit error rate storage unit as the initial bit error rate (step S17).

Then, the magnetic recording apparatus 1 performs the inspection processing shown in FIG. 6 before recording the stored data in the user data area. In FIG. 6, the magnetic recording apparatus 1 sets laser power to a setting value for inspection (normally, initial value) (step S21) and records an inspection pattern for measuring a magnetic write width on the track 1 in the inspection area (step S22). Then, the magnetic write width is measured based on the recording track (step S23), and a value that is a half of a difference between the measurement value set as an inspection magnetic write width and the initial magnetic write width stored on the magnetic write width storage unit is determined as a Δ write offset value (step S24). Then, a position of the write head is controlled to be shifted toward the track 1 in the inspection area by the Δ write offset value determined in step S24, and the inspection pattern for measuring the bit error rate is recorded. Thereafter, the position of the write head is similarly controlled to be shifted toward the adjacent track 2 by the Δ write offset value, and another inspection pattern is recorded (step S24). Because the shingled write magnetic recording is employed, overwriting is performed on the track 2 while the track 2 is partially overlapping the track 1. The bit error rate of the track 1 on which overwriting has been performed is measured (step S26), and the measurement value is set as an inspection bit error rate, and then it is determined whether or not this inspection bit error rate is equal to or less than a predetermined bit error rate (which may be the initial bit error rate stored on the error rate storage unit) (step S27). In a case where the determination result is NO, the laser power is changed (setting value of N+1: N is a natural number) (step S28), and the processing in steps S22 to S28 is repeated until the determination result becomes YES in step S27. In a case where the determination result is YES, the position of the write head is controlled to be shifted, by the Δ write offset value, with respect to the user data area for recording the stored data, and the data is recorded (step S29).

In order to confirm the effect of Example 1, the initial magnetic write width and the initial bit error rate were stored in accordance with the initial value storage processing flow shown in FIG. 5, and then laser power was applied in the following acceleration conditions in order to reproduce change over time of the near-field light irradiation element: laser power of 30 mW was continuously applied for 1000 hours under a high temperature environment of 100° C. Specifically, this change over time is contraction of the element due to migration of atoms of the material from which the near-field light irradiation element is made.

Thereafter, in Example 1, the inspection pattern was recorded in accordance with the inspection processing flow shown in FIG. 6. Herein, in Comparative Example 1, the processing in step S29 is performed without performing the determination in step S27 in the inspection processing flow of FIG. 6. That is, setting of the laser power is not changed from the setting value 1 (initial laser power). Further, in Comparative Example 2, the position of the write head is not controlled to be shifted by the Δ write offset value in the processing in step S29 in the inspection processing flow of FIG. 6, i.e., recording is performed without changing the position of the write head.

FIG. 7 shows measurement values of the magnetic write width with respect to laser power. FIG. 7 shows a result of measurement in step S13 of FIG. 5 as an initial state by using a black circle plot and shows results of measurement in step S23 of FIG. 6 by using white circle plots.

FIG. 8 shows measurement values of the bit error rate with respect to laser power. FIG. 8 shows a result of measurement in step S16 of FIG. 5 as an initial state by using a black circle plot and shows results of measurement in step S26 of FIG. 6 by using white circle plots.

As shown in FIGS. 7 and 8, a relationship between the magnetic write width and the bit error rate with respect to laser power is changed before and after the near-field light irradiation element changes over time. In a case where laser power is increased until the bit error rate becomes equal to or less than the predetermined bit error, the magnetic write width is increased to be wider than the initial magnetic write width.

For example, in a case where the initial laser power was set to 22.8 mW, the laser power in Example 1, Comparative Example 1, and Comparative Example 2 was 26.8 mW, 22.8 mW, and 26.8 mW, respectively. As shown in FIG. 8, the inspection bit error rates in Example 1 and Comparative Example 2 are equivalent to the initial bit error rate, whereas the inspection bit error rate is greatly deteriorated from the initial bit error rate in Comparative Example 1. In a case where recording is performed in the storage area with this laser power setting value, there arises a problem that data cannot be normally recorded in Comparative Example 1. It is necessary to reduce the BPI in order to normally record data, and therefore the BPI is changed from the BPI in the manufacturing process.

Figure 9A:
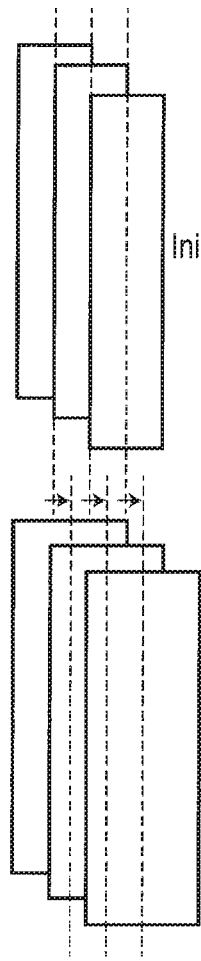
FIGS. 9A, 9B, and 9C are schematic diagrams showing a relationship between a track position and a write head position in Example 1, Comparative Example 1, and Comparative Example 2, respectively, of a magnetic recording apparatus according to an embodiment.
Figure 9B:
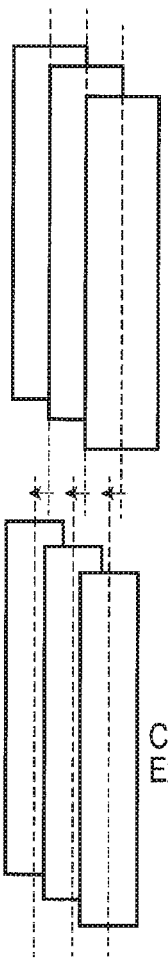
Figure 9C:
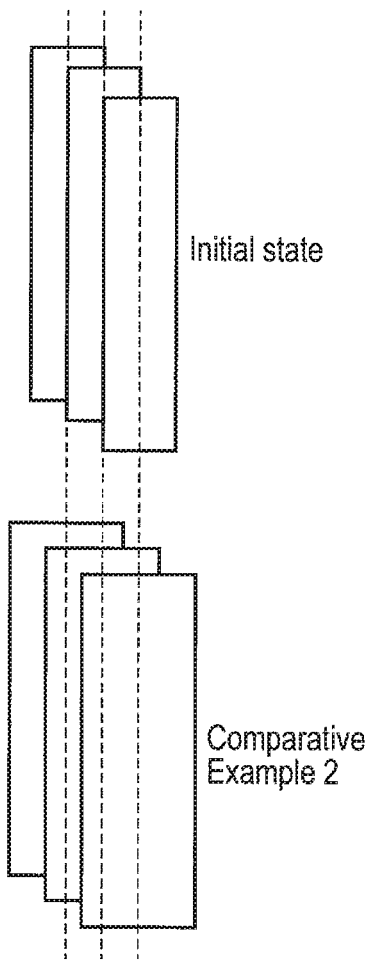

FIGS. 9A, 9B, and 9C are schematic diagrams showing a positional relationship between a state of the track recorded in the storage area and the write head. FIG. 9A shows a state in which overwriting is performed on a track N−1, FIG. 9B shows a state in which overwriting is performed on a track N, and FIG. 9C shows a state in which overwriting is performed on a track N+1. The broken lines indicate the positions of the write head at the time of recording. In FIGS. 9A, 9B, and 9C, the position of the write head is controlled to be shifted by the Δ write offset value and data is recorded in Example 1 and Comparative Example 1, whereas data is recorded at the same position of the write head as the position in the initial state in Comparative Example 2.

FIGS. 10A, 10B, and 10C are schematic diagrams showing a positional relationship between a state of the track recorded in the storage area and the read head. FIG. 10A shows a state in which overwriting is performed on the track N−1, FIG. 10B shows a state in which overwriting is performed on the track N, and FIG. 10C shows a state in which overwriting is performed on the track N+1. The broken lines indicate the positions of the read head at the time of reproduction. The position of the read head is not changed and is therefore positioned at approximately the center of the track remaining at a read center position as a result of overwriting in Example 1 and Comparative Example 1. Meanwhile, as shown in FIG. 7, the magnetic write width in Comparative Example 2 is wider than the initial magnetic write width, and therefore, in Comparative Example 2 where the position of the write head is not changed, the position of the read head is greatly shifted from the center of the track remaining as a result of overwriting. As a result, there arises a problem that data cannot be normally reproduced.

A case where the initial information storage processing of FIG. 5 and the inspection processing of FIG. 6 are performed by a normal recording method will be described as Comparative Example 3. Because the normal recording method is employed, the processing of step S15 in FIG. 5 and step S25 in FIG. 6 is performed only on the track 1, and recording is not performed on the track 2. Further, the determination of the Δ write offset value in step S24 and the control of the shift by the Δ write offset value in the processing in step S29 are not performed.

Figure 11:
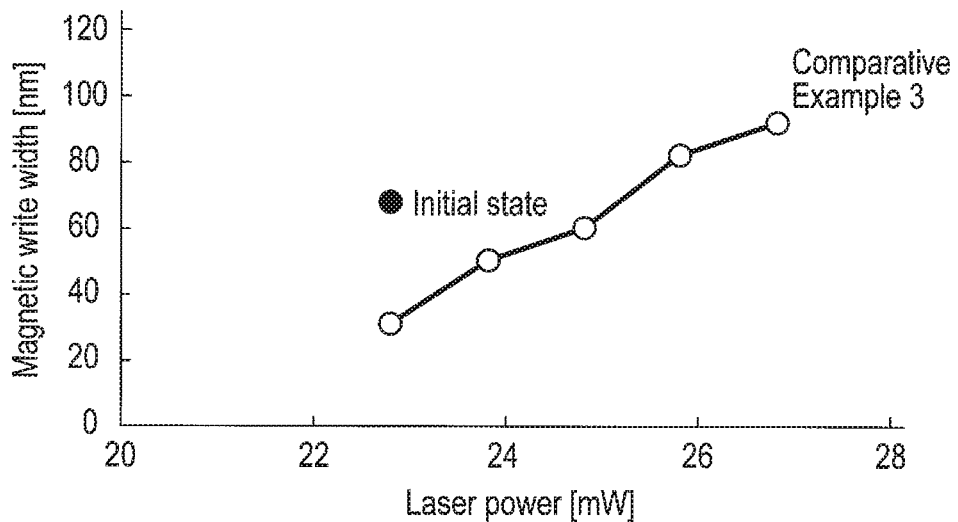
FIG. 11 is a diagram showing a relationship between laser power and a magnetic write width in Comparative Example 3 for use in description of an embodiment.

FIG. 11 shows measurement values of the magnetic write width with respect to laser power. FIG. 11 shows a result of measurement in step S13 of FIG. 5 as an initial state by using a black circle plot and shows results of measurement in step S23 of FIG. 6 by using white circle plots.

Figure 12:
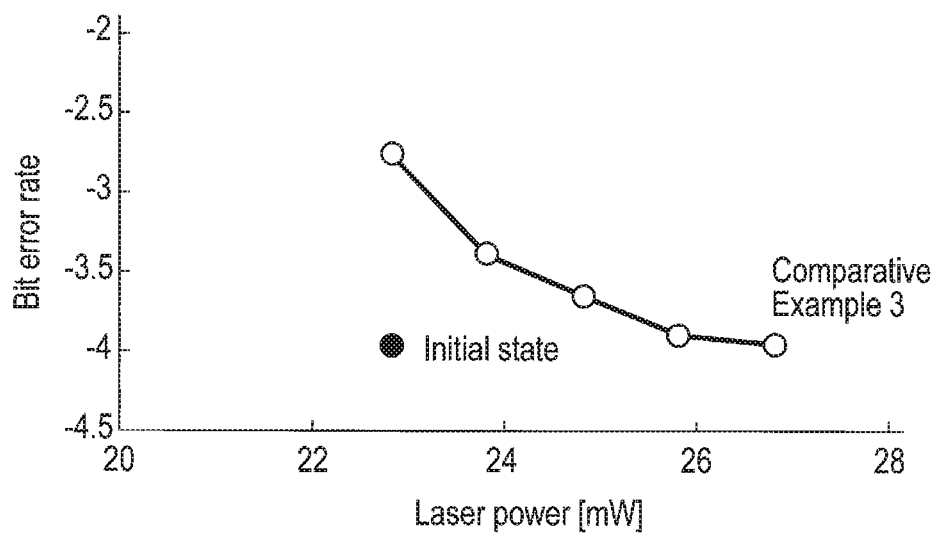
FIG. 12 is a diagram showing a relationship between laser power and a bit error rate in Comparative Example 3 for use in description of an embodiment.

FIG. 12 shows measurement values of the bit error rate with respect to laser power. FIG. 12 shows a result of measurement in step S16 of FIG. 5 as an initial state by using a black circle plot and shows results of measurement in step S26 of FIG. 6 by using white circle plots.

As shown in FIGS. 11 and 12, a relationship between the magnetic write width and the bit error rate with respect to laser power is changed before and after the near-field light irradiation element changes over time. In a case where laser power is increased until the bit error rate is equal to or less than the initial bit error, the magnetic write width is increased to be wider than the initial magnetic write width.

FIG. 13 is a schematic diagram showing a positional relationship among a state of the track recorded in the storage area, the write head, and the read head. Because the normal recording method is employed, FIG. 13 shows a state in which recording is performed on the track N, and then recording is performed on the track N−1 and the track N+1 in order. The broken lines indicate the positions of the write head at the time of recording and the read head at the time of reproduction. Because the magnetic write width is increased as shown in FIG. 13, there is a risk that data recorded on the track N may not be reproduced because the data may be deteriorated or erased due to an influence of the tracks N−1 and N+1. A plurality of times of recording is performed on the track in the normal recording method, and thus the risk of deterioration and erasure is further increased. In order to avoid this, it is necessary to increase a track pitch in accordance with an increase in the magnetic write width. However, the TPI set in the manufacturing process is changed. When laser power is reduced to narrow the magnetic write width, the bit error rate of the track N is deteriorated, and thus there arises a problem that data cannot be normally recorded. It is necessary to reduce the BPI in order to normally record data, and therefore the BPI is changed from the BPI in the manufacturing process.

From the above, in the shingled write magnetic recording, signal quality is checked in the inspection area before data is recorded, and the data is recorded after laser power and the write offset value are adjusted. Therefore, by performing the operation in Example 1, it is possible to maintain long-term reliability without changing a set BPI/TPI format.

Example 2

FIG. 14 is a flowchart of inspection processing that is performed before stored data is recorded in a user data area in Example 2 of this embodiment. In an inspection area, a magnetic recording apparatus 1 sets inspection laser power to a setting value 1 (initial laser power) (step S31) and sets a Δ write offset value to a start value (step S32). Herein, it is determined whether or not the Δ write offset value is equal to or less than an end value (step S33). In a case where the determination result is NO, the inspection laser power is changed (step S34). Then, the processing returns to step S32, and the processing of changing the inspection laser power is repeated until the Δ write offset value becomes equal to or less than the end value.

In a case where the determination result is YES in step S33, the Δ write offset value is determined at that time (step S35). Subsequently, a position of a write head is controlled to be shifted toward a track 1 in the inspection area by the Δ write offset, and an inspection pattern for measuring a bit error rate is recorded. Thereafter, the position of the write head is similarly controlled to be shifted toward an adjacent track 2 by the Δ write offset, and another inspection pattern is recorded (step S36). Because the shingled write magnetic recording is employed, overwriting is performed on the track 2 while the track 2 is partially overlapping the track 1. The bit error rate of the track 1 on which overwriting has been performed is the measured (step S37), and it is determined whether or not the measured bit error rate serving as an inspection bit error rate is equal to or less than a predetermined bit error rate (initial bit error rate) stored on an error rate storage unit (step S38). In a case where the determination result is NO, a +step value is added to the Δ write offset value (step S39). Then, the processing returns to step S33, and steps S33 to S37 are repeated until the determination result becomes YES in step S38. In a case where the determination result is YES in step S38, the position of the write head is controlled to be shifted by the Δ write offset, and acquired data is recorded in the user data area for recording stored data (step S310).

According to the inspection processing of Example 2, as well as according to that of Example 1, in the shingled write magnetic recording, signal quality is checked in the inspection area before data is recorded, and the data is recorded after laser power and the write offset value are adjusted. Therefore, even in a case where the near-field light irradiation element changes over time, it is possible to maintain long-term reliability without changing a set BPI/TPI format.

Example 2

Figure 15:
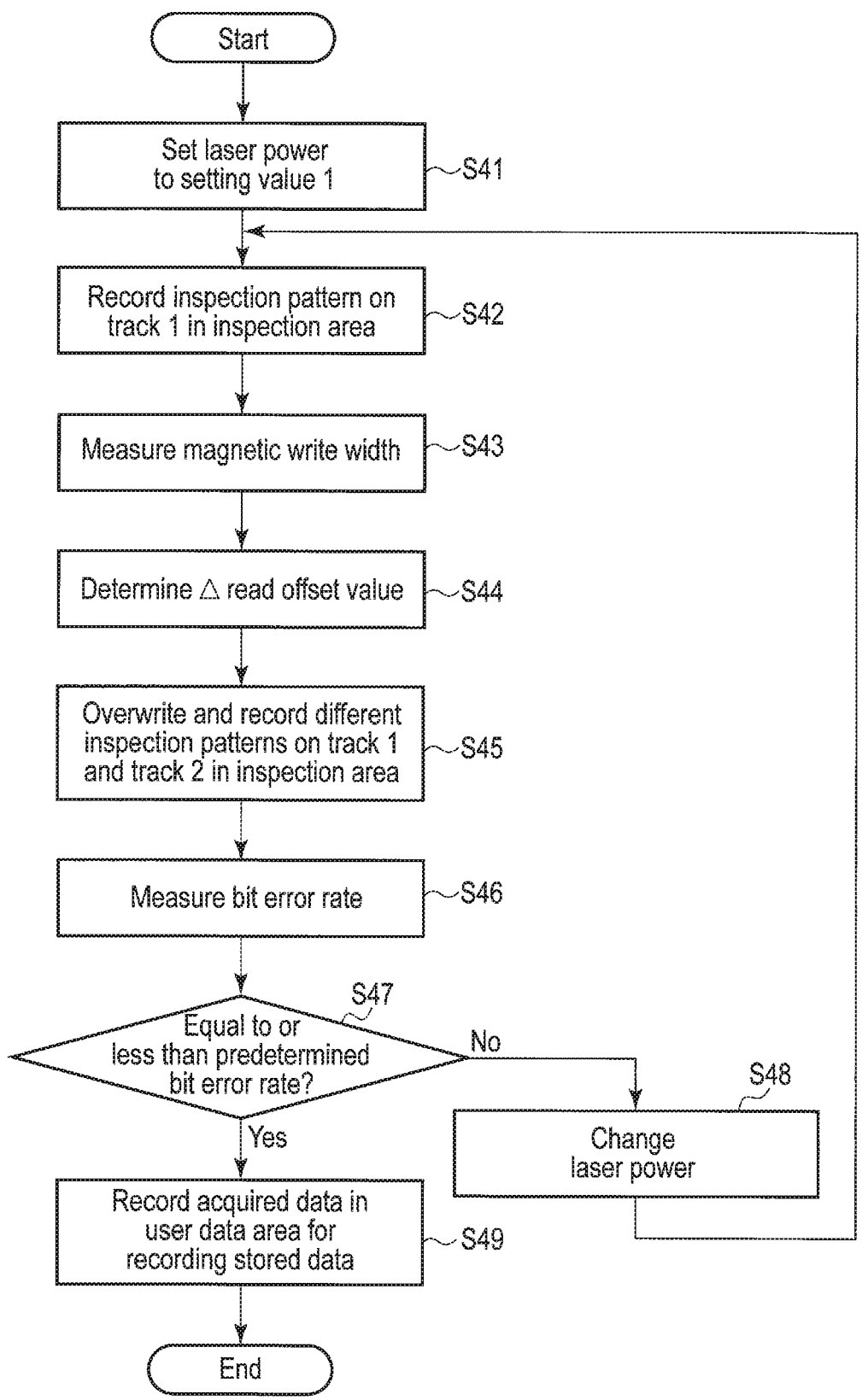
FIG. 15 is a flowchart showing a flow of inspection processing in Example 3 of a magnetic recording apparatus according to an embodiment.

FIG. 15 is a flowchart of inspection processing that is performed before stored data is recorded in a user data area in Example 3 of this embodiment. In an inspection area, a magnetic recording apparatus 1 sets inspection laser power to a setting value 1 (initial laser power) (step S41) and records an inspection pattern for measuring a magnetic write width on a track 1 in the inspection area (step S42). Then, the magnetic write width is measured (step S43), and the measurement result is set as an inspection magnetic write width, and then a value that is a half of a difference between the inspection magnetic write width and the initial magnetic write width stored on a magnetic write width storage unit is determined as a Δ read offset value (step S44). An inspection pattern for measuring a bit error rate is recorded on the track 1 in the inspection area, and thereafter another inspection pattern is recorded on an adjacent track 2 (step S45). At this time, because the shingled write magnetic recording is employed, overwriting is performed on the track 2 while the track 2 is partially overlapping the track 1. A position of the read head is controlled to be shifted by the Δ read offset, and the bit error rate of the track 1 on which overwriting has been performed is measured (step S46), and then the measurement result is set as an inspection bit error rate. It is determined whether or not the inspection bit error rate is equal to or less than the initial bit error rate stored on the error rate storage unit (step S47). In a case where the determination result is NO, the inspection laser power is changed (step S48), and the processing in steps S42 to S47 is repeated until the determination result becomes YES in step S47. In a case where the determination result is YES in step S47, acquired data is recorded in the user data area for recording stored data (step S49). At the time of reproduction, the position of the read head is controlled to be shifted by the Δ read offset, and the recorded data is reproduced from the user data area.

In order to confirm the effect of Example 3, the initial magnetic write width and the initial bit error rate were stored in accordance with the flow shown in FIG. 5, and then laser power was applied in the following acceleration conditions in order to reproduce change over time of the near-field light irradiation element: laser power of 30 mW was continuously applied for 1000 hours under a high temperature environment of 100° C. Specifically, this change over time is contraction of the element due to migration of atoms of the material from which the near-field light irradiation element is made. Thereafter, in Example 3, reproduction was performed according to the flow of FIG. 15. Herein, in Comparative Example 4, reproduction operation is performed after the recording operation in step S49 is performed without performing the determination in step S47 in the flow of FIG. 12. That is, setting of laser power is not changed from the initial laser power. Further, in Comparative Example 5, the Δ read offset value is not controlled when the data recorded in step S49 in FIG. 15 is reproduced.

Figure 16:
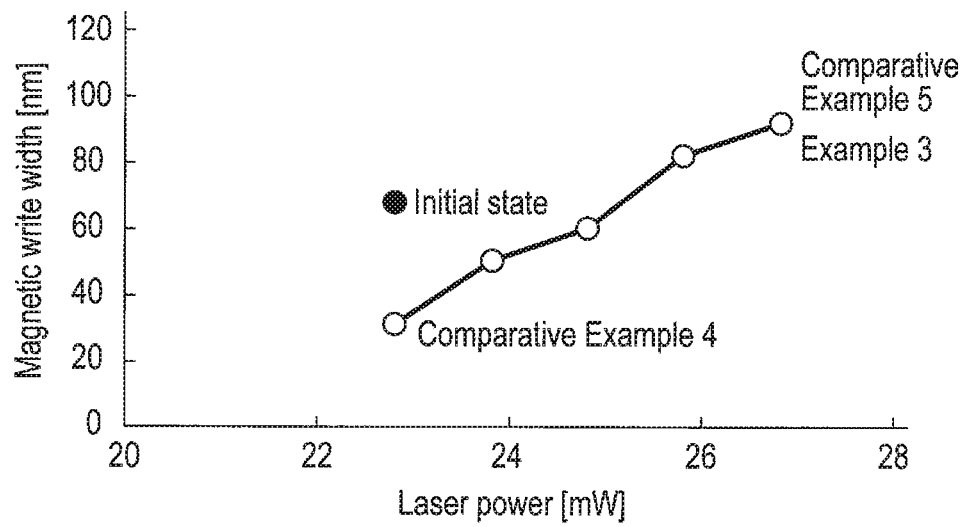
FIG. 16 is a diagram showing a relationship between laser power and a magnetic write width in Example 3, Comparative Example 4, and Comparative Example 5 of a magnetic recording apparatus according to an embodiment.

FIG. 16 shows measurement values of the magnetic write width with respect to laser power. FIG. 16 shows a result of measurement in step S13 of FIG. 5 as an initial state by using a black circle plot and shows results of measurement in step S43 of FIG. 15 by using white circle plots.

Figure 17:
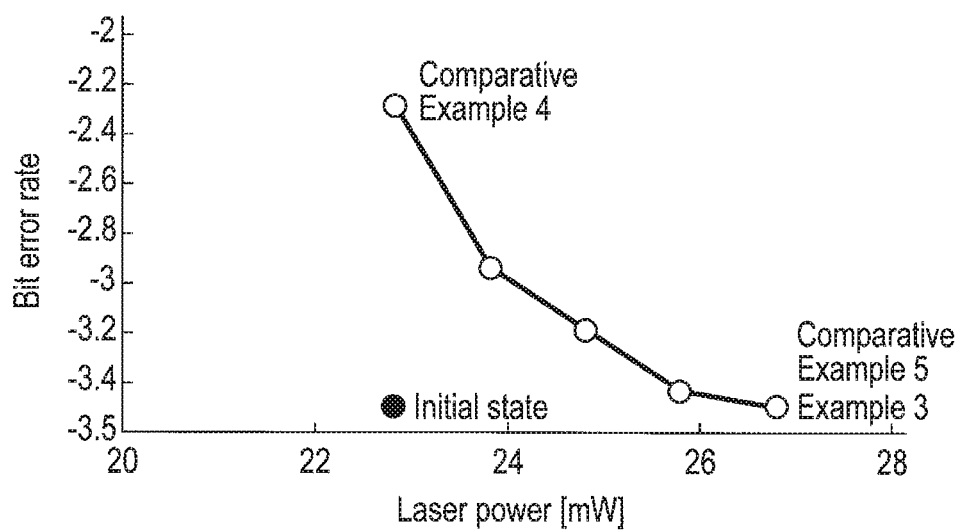
FIG. 17 is a diagram showing a relationship between laser power and a bit error rate in Example 3, Comparative Example 4, and Comparative Example 5 of a magnetic recording apparatus according to an embodiment.

FIG. 17 shows measurement values of the bit error rate with respect to laser power. FIG. 17 shows a result of measurement in step S16 of FIG. 5 as an initial state by using a black circle plot and shows results of measurement in step S46 of FIG. 15 by using white circle plots.

As shown in FIGS. 16 and 17, a relationship between the bit error rate and the magnetic write width with respect to laser power is changed before and after the near-field light irradiation element changes over time. In a case where laser power is applied until the bit error rate becomes equal to or less than a predetermined (normally, initial) bit error, the magnetic write width is increased to be wider than the predetermined magnetic write width.

Herein, in a case where the initial laser power was set to 22.8 mW, the laser power in Example 3, Comparative Example 4, and Comparative Example 5 was 26.8 mW, 22.8 mW, and 26.8 mW, respectively. As shown in FIG. 17, the inspection bit error rates in Example 3 and Comparative Example 5 are equivalent to the initial bit error rate, whereas the inspection bit error rate is greatly deteriorated from the initial bit error rate in Comparative Example 4. In a case where recording is performed in the storage area with this laser power setting value, there arises a problem that data cannot be normally recorded in Comparative Example 4. It is necessary to reduce the BPI in order to normally record data, and therefore the BPI is changed from the BPI in the manufacturing process.

Figure 18A:
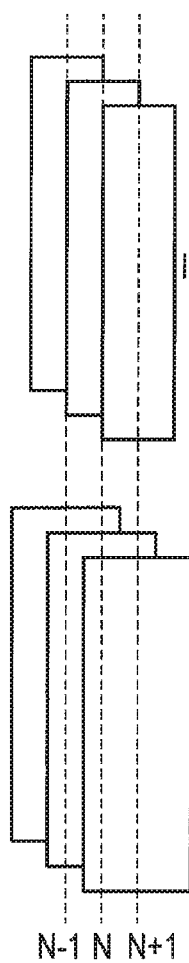
FIGS. 18A, 18B, and 18C are schematic diagrams showing a positional relationship between a track and a write head in Example 3, Comparative Example 4, and Comparative Example 5, respectively, of a magnetic recording apparatus according to an embodiment.
Figure 18B:
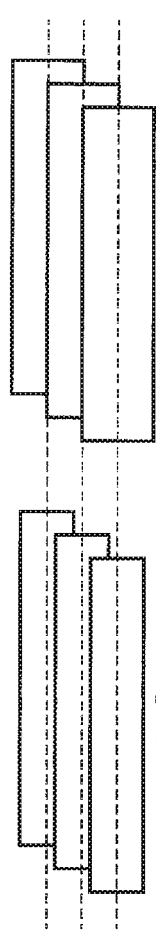
Figure 18C:
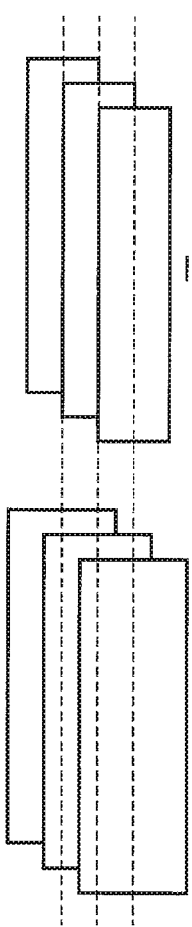

FIGS. 18A, 18B, and 18C are schematic diagrams, each of which shows a state of the track recorded in the storage area. FIGS. 18A, 18B, and 18C show Example 3, Comparative Example 4, and Comparative Example 5, respectively, each of which shows a state in which overwriting is performed on the track N−1, the track N, and the track N+1. The broken lines indicate the positions of the write head at the time of recording. FIGS. 19A, 19B, and 19C are schematic diagrams, each of which shows a state of the track recorded in the storage area. FIGS. 19A, 19B, and 19C show Example 3, Comparative Example 4, and Comparative Example 5, respectively, each of which shows a state in which overwriting is performed on the track N−1, the track N, and the track N+1. The broken lines indicate the positions of the read head at the time of reproduction. The position of the read head is changed and is therefore positioned at approximately the center of the track remaining at a read center position as a result of overwriting in Example 3 and Comparative Example 4, as shown in FIGS. 19A and 19B, respectively. Meanwhile, as shown in FIG. 19C, the magnetic write width in Comparative Example 5 is wider than the initial magnetic write width, and therefore, in Comparative Example 5 where the position of the read head is not changed, the position of the read head is greatly shifted from the center of the track remaining as a result of overwriting. As a result, there arises a problem that data cannot be normally reproduced.

Meanwhile, according to Example 3, in the shingled write magnetic recording, signal quality is checked in the inspection area before data is reproduced, and the data is reproduced after laser power and the write offset value are adjusted. Therefore, even in a case where a near-field light irradiation element changes over time, it is possible to maintain long-term reliability without changing a set BPI/TPI format.

Example 4

Figure 20:
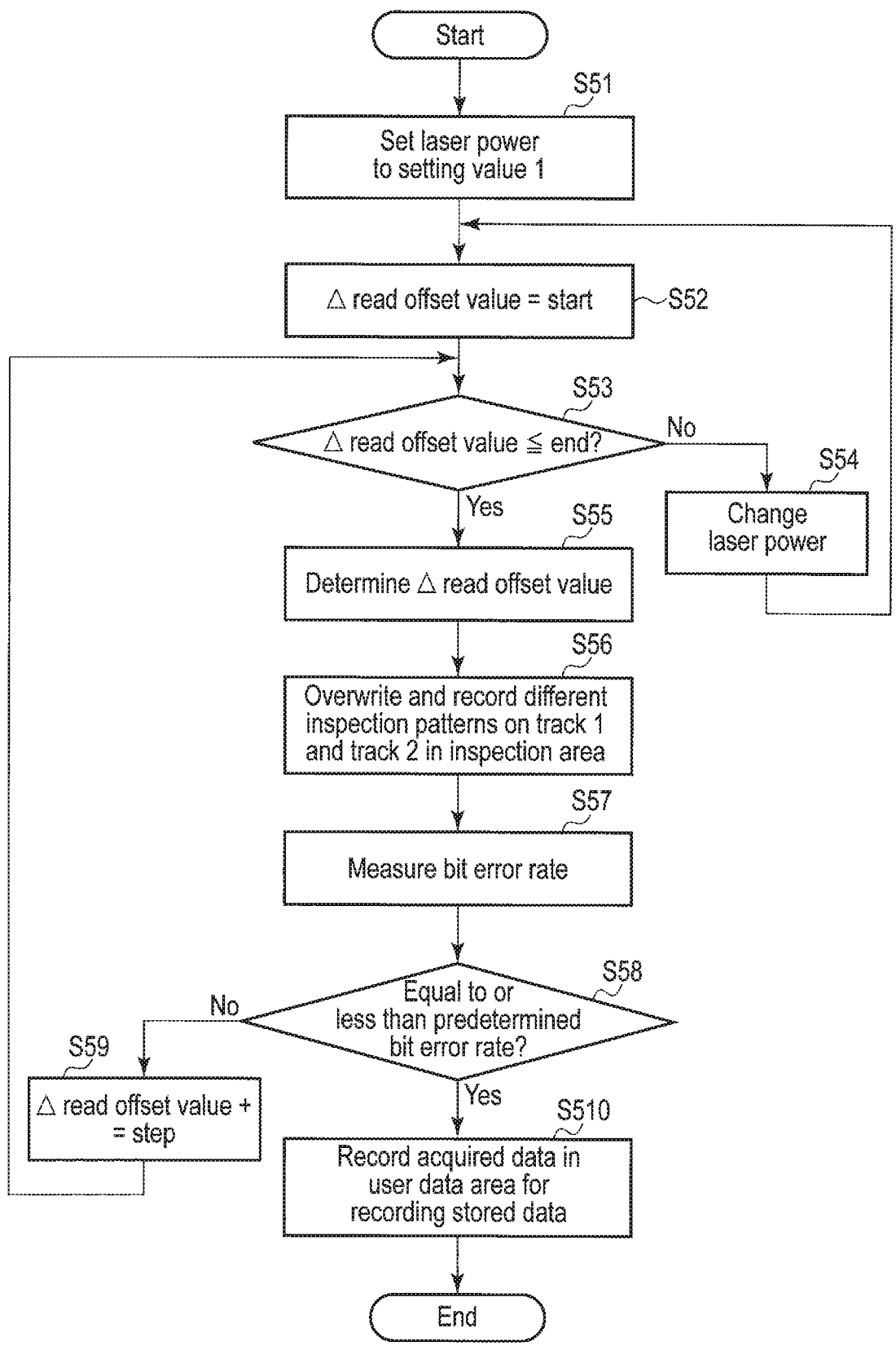
FIG. 20 is a flowchart showing a flow of inspection processing in Example 4 of a magnetic recording apparatus according to an embodiment.

FIG. 20 is a flowchart of inspection processing that is performed before recording in a user data area is performed in Example 4 of this embodiment. In an inspection area, a magnetic recording apparatus 1 sets inspection laser power to a setting value 1 (initial laser power) (step S51) and sets a Δ read offset value to a start value (step S52). Herein, it is determined whether or not the Δ read offset value is equal to or less than an end value (step S53). In a case where the determination result is NO in step S53, the inspection laser power is changed until the determination result becomes YES (step S54). In a case where the determination result is YES in step S53, the Δ read offset value is determined (step S55), and an inspection pattern for measuring a bit error rate is recorded on a track 1 in the inspection area, and thereafter another inspection pattern is recorded on an adjacent track 2 (step S56). Because the shingled write magnetic recording is employed, overwriting is performed on the track 2 while the track 2 is partially overlapping the track 1.

Then, a position of a read head is controlled by the Δ read offset, and the bit error rate of the track 1 on which overwriting has been performed is measured (step S57) and is then set as an inspection bit error rate. It is determined whether or not the inspection bit error rate is equal to or less than a predetermined error rate (e.g., an initial bit error rate stored on an error rate storage unit) (step S58). In a case where the determination result is NO, a +step value is added to the Δ read offset value (step S59), and the processing in steps S53 to S58 is repeated until the determination result becomes YES in step S58. In a case where the determination result is YES in step S58, acquired data is recorded in the user data area for recording stored data (step S510). At the time of reproduction, the position of the read head is controlled to be shifted by the Δ read offset, and the recorded data is reproduced from the user data area.

Also according to Example 4, in the shingled write magnetic recording, signal quality is checked in the inspection area before data is reproduced, and the data is reproduced after laser power and the write offset value are adjusted. Therefore, even in a case where a near-field light irradiation element changes over time, it is possible to maintain long-term reliability without changing a set BPI/TPI format.

Example 5

Figure 21A:
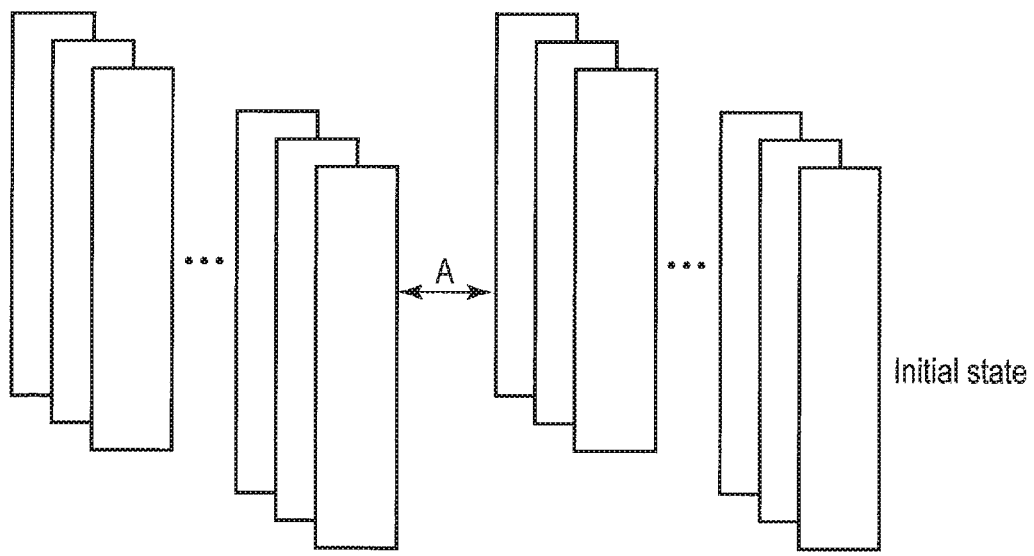
FIGS. 21A and 21B are schematic diagrams showing a positional relationship between a track and a read head in Example 5 of a magnetic recording apparatus according to an embodiment.
Figure 21B:
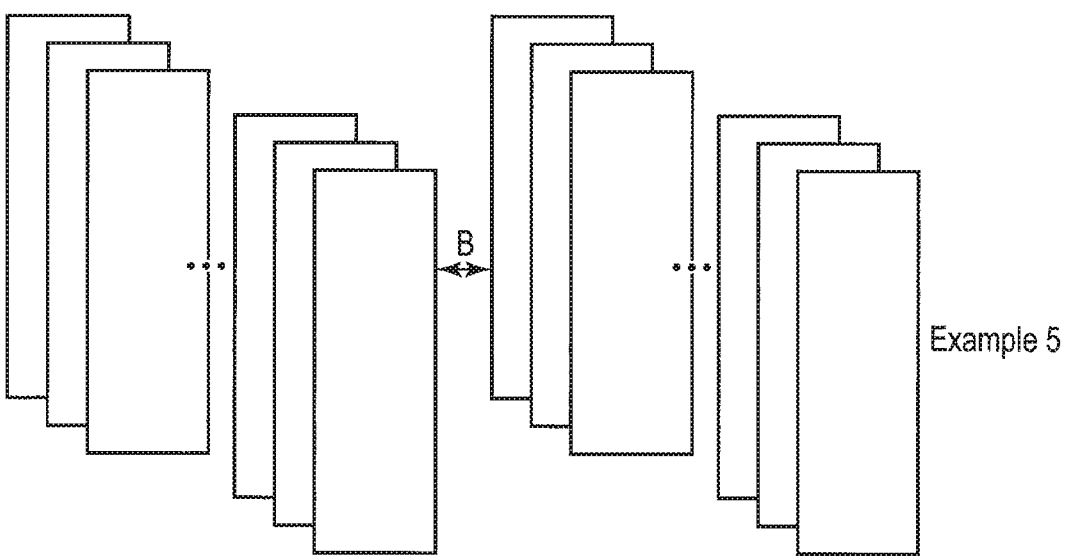

FIGS. 21A and 21B show Example 5 of this embodiment. FIG. 21A shows a case where a guard band width, which is a margin width provided between bands each of which includes a plurality of track groups, is set to A that is a guard band width in an initial state. FIG. 21B shows a guard band width B in Example 5 where laser power is changed. Overwriting is not performed on a track on which recording is finally performed in the band. Therefore, in a case where a magnetic write width of the track on which recording is finally performed in the band in Example 5 where laser power is changed is larger than an initial magnetic write width of the track on which recording is finally performed in a band in an initial state, the guard band width B in Example 5 where laser power is changed is smaller than the initial guard band width A.

As described above, in Example 5, in a case where the guard band width B is larger than a predetermined guard band width, recording is permitted. Meanwhile, in a case where the guard band width B is smaller than the predetermined guard band width, recording on the last track in the band may be prohibited. This predetermined guard band width may be set based on a temperature of an apparatus, a vibration environment, or the like.

Note that, in the above embodiments, the position of the read head may be controlled by comparing and determining an initial reproduction output value and a reproduction output value at the time of inspection, instead of the bit error rate.

While certain embodiments have been described, these embodiments have been presented by way of example only, and are not intended to limit the scope of the inventions. Indeed, the novel embodiments described herein may be embodied in a variety of other forms; furthermore, various omissions, and substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording apparatus, comprising:
   a disk which includes a track group including a first track and a second track partially overlapping the first track in a band;
   a magnetic head which includes a heat device which heats a recording layer of the disk, a write head which writes data to a range of the disk heated by the heat device, and a read head which reads data from a track in the track group of the disk; and
   a controller which controls positions of the write head and the read head, wherein
   the controller includes:
      comparison processing which compares a first recording signal obtained from the first track and a second recording signal obtained from the second track;
      adjustment processing which adjusts an amount of heating of the heat device based on a result of the comparison in the comparison processing; and
      position control processing which controls the position of the write head based on a result of the adjustment in the adjustment processing so that the pitch between the first track and the second track is constant within the band.

2. A magnetic recording apparatus, comprising:
   a disk which includes a track group including a first track and a second track partially overlapping the first track in a band;
   a magnetic head which includes a light irradiation element which emits light for heating the disk, a write head which writes data to a range of the disk heated by the light emitted by the light irradiation element, and a read head which reads data from a track in the track group of the disk; and
   a controller which controls positions of the write head and the read head, wherein
   the controller includes:
      first measurement processing which measures quality of a first recording signal obtained from the first track;
      second measurement processing which measures quality of a second recording signal obtained from the second track;
      comparison processing which compares the quality of the first recording signal and the quality of the second recording signal;
      adjustment processing which adjusts light irradiation power of the light irradiation element based on a result of the comparison in the comparison processing; and
      position control processing which controls the position of the write head based on a result of the adjustment in the adjustment processing so that the pitch between the first track and the second track is constant within the band.

3. The magnetic recording apparatus of claim 2, wherein in the adjustment processing, the light irradiation power is adjusted to be equal to or more than irradiation power in the first measurement processing.

4. The magnetic recording apparatus of claim 2, wherein in the first measurement processing, an error rate of the first recording signal is measured based on a first inspection pattern recorded in the first track, and in the second measurement processing, an error rate of the second recording signal is measured based on a second inspection pattern different from the first inspection pattern recorded in the second track.

5. The magnetic recording apparatus of claim 2, wherein the controller further comprises storage processing which stores a magnetic write width and an error rate measured at the first measurement processing,
   in the comparison processing, a magnetic write width obtained when the light irradiation element emits light and the magnetic write width stored in the storage processing are compared, and
   in the position control processing, the position of the write head is controlled to be shifted by a value that is a half of a difference between a magnetic write width obtained when the light irradiation power is adjusted and the magnetic write width stored in the storage processing.

6. The magnetic recording apparatus of claim 2, wherein in the second measurement processing, the quality of the second recording signal is measured by using a plurality of write offset amounts, and
   in the position control processing, the position of the write head is controlled based on a write offset amount that brings the best quality of the second recording signal.

7. The magnetic recording apparatus of claim 2, wherein the disk includes a plurality of bands including a plurality of track groups including the first track and the second track partially overlapping the first track and a guard band provided between the bands, and
   the guard band has a width narrower than a width in an initial state, and a magnetic write width of a track on which recording is finally performed in the band is wider than an initial magnetic write band of a track on which recording is finally performed in the band in the initial state.

8. A magnetic recording apparatus, comprising:
   a disk which includes a track group including a first track and a second track partially overlapping the first track in a band;
   a magnetic head which includes a heat device which heats a recording layer of the disk, a write head which writes data to a range of the disk heated by the heat device, and a read head which reads data from a track in the track group of the disk; and
   a controller which controls positions of the write head and the read head, wherein the controller includes:
  comparison processing which compares a first recording signal obtained from the first track and a second recording signal obtained from the second track;
  adjustment processing which adjusts an amount of heating of the heat device based on a result of the comparison in the comparison processing; and
  position control processing which controls the position of the read head based on a result of the adjustment in the adjustment processing so that the pitch between the first track and the second track is constant within the band.

9. A magnetic recording apparatus, comprising:
a disk which includes a track group including a first track and a second track partially overlapping the first track in a band;
a magnetic head which includes a light irradiation element which emits light for heating the disk, a write head which writes data to a range of the disk heated by the light emitted by the light irradiation element, and a read head which reads data from a track in the track group of the disk; and
a controller which controls positions of the write head and the read head, wherein
the controller includes:
  first measurement processing which measures quality of a first recording signal obtained from the first track;
  second measurement processing which measures quality of a second recording signal obtained from the second track;
  comparison processing which compares the quality of the first recording signal and the quality of the second recording signal;
  adjustment processing which adjusts light irradiation power of the light irradiation element based on a result of the comparison in the comparison processing; and
  position control processing which controls the position of the read head based on a result of the adjustment in the adjustment processing so that the pitch between the first track and the second track is constant within the band.

10. The magnetic recording apparatus of claim 9, wherein
in the adjustment processing, the light irradiation power is adjusted to be equal to or more than irradiation power in the first measurement processing.

11. The magnetic recording apparatus of claim 9, wherein
in the first measurement processing, an error rate of the first recording signal is measured based on a first inspection pattern recorded in the first track, and
in the second measurement processing, an error rate of the second recording signal is measured based on a second inspection pattern different from the first inspection pattern recorded in the second track.

12. The magnetic recording apparatus of claim 9, wherein
the controller further comprises storage processing which stores a magnetic write width and an error rate measured at the first measurement processing,
in the comparison processing, a magnetic write width obtained when the light irradiation power is adjusted and the magnetic write width stored in the storage processing are compared, and
in the position control processing, the position of the read head is controlled to be shifted by a value that is a half of a difference between the magnetic write width obtained when the light irradiation power is adjusted and the magnetic write width stored in the storage processing.

13. The magnetic recording apparatus of claim 9, wherein
in the second measurement processing, the quality of the second recording signal is measured by using a plurality of read offset amounts, and
in the position control processing, the position of the read head is controlled based on a read offset amount that brings the best quality of the second recording signal.

14. The magnetic recording apparatus of claim 9, wherein
the disk includes a plurality of bands including a plurality of track groups including the first track and the second track partially overlapping the first track and a guard band provided between the bands, and
the guard band has a width narrower than a width in an initial state, and a magnetic write width of a track on which recording is finally performed in the band is wider than an initial magnetic write band of a track on which recording is finally performed in the band in the initial state.

* * * * *